United States Patent
Schofield et al.

(10) Patent No.: US 10,628,988 B2
(45) Date of Patent: Apr. 21, 2020

(54) SYSTEMS AND METHODS FOR ITEM CHARACTERISTIC SIMULATION

(71) Applicant: Aladdin Manufacturing Corporation, Calhoun, GA (US)

(72) Inventors: Christina Schofield, Cartersville, GA (US); Framarz Mistry, Calhoun, GA (US)

(73) Assignee: Aladdin Manufacturing Corporation, Calhoun, GA (US)

(*) Notice: Subject to any disclaimer, the term of this patent is extended or adjusted under 35 U.S.C. 154(b) by 0 days.

(21) Appl. No.: 15/952,631

(22) Filed: Apr. 13, 2018

(65) Prior Publication Data
US 2019/0318525 A1   Oct. 17, 2019

(51) Int. Cl.
G06T 15/00 (2011.01)
G06F 3/16 (2006.01)
G06F 16/64 (2019.01)

(52) U.S. Cl.
CPC ............ *G06T 15/005* (2013.01); *G06F 3/165* (2013.01); *G06F 16/64* (2019.01)

(58) Field of Classification Search
CPC .............................................. G10K 2210/3052
See application file for complete search history.

(56) References Cited

U.S. PATENT DOCUMENTS

| | | | | |
|---|---|---|---|---|
| 9,530,426 B1* | 12/2016 | Wright | | H04S 1/002 |
| 2003/0031333 A1* | 2/2003 | Cohen | | H04S 7/301 |
| | | | | 381/303 |
| 2011/0148924 A1* | 6/2011 | Tapley | | G06F 3/011 |
| | | | | 345/634 |
| 2012/0113224 A1* | 5/2012 | Nguyen | | G06K 9/0057 |
| | | | | 348/46 |
| 2013/0202125 A1* | 8/2013 | De Sena | | G10K 15/12 |
| | | | | 381/63 |
| 2014/0270182 A1* | 9/2014 | Vilermo | | H04S 7/303 |
| | | | | 381/17 |

(Continued)

FOREIGN PATENT DOCUMENTS

EP          0633549 A2    1/1995
JP          H1031409 A    2/1998

(Continued)

OTHER PUBLICATIONS

Silent Guard, 2011, screenshots captured from the hyperlink provided in Applicant's IDS, pp. 1-4 (Year: 2011).*

(Continued)

*Primary Examiner* — Phong X Nguyen
(74) *Attorney, Agent, or Firm* — Alston & Bird LLP (57) ABSTRACT

A virtual reality system provides users with visual and/or audible representations of various characteristics of items that are virtually included within a simulation. To provide such representations to a user, embodiments compile data regarding aesthetic and/or sound characteristics of one or more items included in a simulation and virtually build a simulated environment including the one or more items. The simulation may include a visual rendering including visual aspects of the one or more items included in the simulated environment and/or one or more audio files representing one or more sound characteristics of the items included in the simulation.

19 Claims, 3 Drawing Sheets

(56) References Cited

U.S. PATENT DOCUMENTS

| | | | | |
|---|---|---|---|---|
| 2015/0010169 A1* | 1/2015 | Popova | .................. | H04S 7/303 |
| | | | | 381/107 |
| 2015/0057083 A1* | 2/2015 | Mehra | .................... | G10K 11/04 |
| | | | | 463/35 |
| 2016/0055857 A1* | 2/2016 | Johnston | ................. | G10L 21/00 |
| | | | | 704/500 |
| 2016/0088417 A1* | 3/2016 | Kim | .................... | G02B 27/017 |
| | | | | 381/17 |
| 2016/0109284 A1* | 4/2016 | Hammershoi | ........... | G01H 7/00 |
| | | | | 73/586 |
| 2017/0171684 A1* | 6/2017 | Badler | .................... | G10L 25/18 |
| 2018/0232471 A1* | 8/2018 | Schissler | ................. | G06T 17/20 |
| 2018/0332420 A1* | 11/2018 | Salume | ............. | G06K 9/00671 |
| 2019/0116448 A1* | 4/2019 | Schmidt | ................. | G06F 3/167 |
| 2019/0302255 A1* | 10/2019 | Clark | ..................... | G06T 19/20 |

FOREIGN PATENT DOCUMENTS

| | | | |
|---|---|---|---|
| JP | H11102154 | A | 4/1999 |
| JP | H11153946 | A | 6/1999 |
| JP | 2000181341 | A | 6/2000 |
| JP | 2004085665 | A | 3/2004 |
| JP | 2007003989 | A | 1/2007 |
| JP | 2010032961 | A | 2/2010 |
| JP | 5176757 | B2 | 4/2013 |
| JP | 2014167442 | A | 9/2014 |

OTHER PUBLICATIONS

Silent Guard, "Virtual Sound Lab", 2011 Copyright, <http://www.silent-guard.com/flash_page.html>, Atrium Companies, Inc.

\* cited by examiner

SYSTEMS AND METHODS FOR ITEM CHARACTERISTIC SIMULATION

BACKGROUND

Certain item types are rated and/or sold with individually determined sound ratings that are indicative of various sound-related characteristics of the items. For example, the sound rating may be indicative of how well a particular item insulates sound on one side of the item and/or how well the item reflects sound within a room. Flooring materials, ceiling materials, wall coverings, windows, doors, and other building materials are often sold with printed or otherwise visually-apparent information about these sound ratings, and periodically this information includes comparisons to other common noise levels as reference points for consumers. For example, the information may suggest whether or not a person could hear a conversation at normal volume through the item, a vacuum cleaner operating in an adjacent room, and/or the like.

Even with the inclusion of comparison information for consumers to better understand sound ratings for various items, consumers may still have difficulty in comparing sound ratings for various items when shopping. Therefore a need exists for concepts enabling consumers to more easily compare sound ratings for various items.

BRIEF SUMMARY

Various embodiments are directed to a virtual reality system providing audio samples to users indicative of various item sound ratings. The sound samples are provided to users of the device via one or more sound output mechanisms of the virtual reality system (e.g., headphones, earbuds, speakers, and/or the like). The system may be used in any environment, thereby providing users with accurate, sound-based information about a given item's sound ratings, regardless of where the user is currently located.

Various embodiments are directed to a virtual reality system for simulating characteristics of items included within a simulation. The virtual reality system may comprise an onboard computing system having one or more non-transitory memory storage areas and one or more processors, the onboard computing system configured to: compile data regarding aesthetic and sound characteristics of one or more items included within a simulation; virtually build a simulated environment including the one or more items by: rendering, via a display device in electronic communication with the onboard computing system, visual aspects of the one or more items within the simulated environment; compiling one or more selected audio files from a plurality of item-agnostic audio files, wherein the one or more selected audio files are representative of one or more sound characteristics of the one or more items based on item data stored in the one or more memory storage areas; and output, via the display device and one or more audio output devices, the simulated environment, wherein the one or more selected audio files are executed to output a calibrated sound representative of sound characteristics of the one or more items included in the simulated environment.

In certain embodiments, each of the plurality of item-agnostic audio files comprise data indicative of an item sound rating represented by the contained audio. Those item-agnostic audio files may comprise audio recorded during a sound rating test. Moreover, the one or more items included within the simulation are selected from a plurality of items represented in data stored within the one or more memory storage areas. Those items to be included within the simulation may be selected based on user input provided to a user menu generated by the onboard computing system. Moreover, the onboard computing system may be configured to electronically communicate with a central server comprising one or more central non-transitory memory storage areas storing data indicative of a plurality of items available for display via the virtual reality system.

In certain embodiments, virtually building a simulated environment further comprises: receiving image data of a real-world environment; and augmenting the image data by rendering visual aspects of the one or more items over portions of the image data. Moreover, the one or more audio output devices are calibrated such that the executed audio files cause the one or more audio output devices to output a sound at a volume corresponding to a sound rating of the one or more items. In certain embodiments, the onboard computing system is configured to determine combined audio characteristics of a plurality of items included within the simulation, and wherein the one or more selected audio files are determined to be representative of the combined audio characteristics of the plurality of items included within the simulation. In certain embodiments, the one or more audio files contain a sound selected from: a ping, a tapper output, a high-heels walking example, or a sample conversation.

Various embodiments are directed to a method for virtually simulating characteristics of an environment. The method may comprise: compiling data regarding aesthetic and sound characteristics of one or more items to be included within a simulation; virtually building a simulated environment including the one more items by: rendering, via a display device, visual aspects of the one or more items within the simulated environment; compiling one or more selected audio files from a plurality of item-agnostic audio files, wherein the one or more selected audio files are representative of one or more sound characteristics of the one or more items based on item data stored in the one or more memory storage areas; and outputting, via the display device and one or more audio output devices, the simulated environment, wherein the one or more selected audio files are executed to output a calibrated sound representative of sound characteristics of the one or more items included in the simulated environment.

Moreover, each of the plurality of item-agnostic audio files may comprise data indicative of an item sound rating represented by the contained audio, and wherein compiling one or more selected audio files comprises identifying item-agnostic audio files representing an item sound rating matching data identifying an item sound rating for the one or more items included in the simulation. In certain embodiments, the method further comprises: selecting the one or more items included within the simulation from a plurality of items represented in data stored within the one or more memory storage areas. Moreover, the method may further comprise: generating a visual user menu identifying a plurality of available items to be included within the simulation; and receiving user input identifying the one or more selected items via the user menu.

In various embodiments, the method further comprises: retrieving, from a central server comprising one or more central non-transitory memory storage areas, item data indicative of the one or more items included within the simulation. In certain embodiments, the method further comprises receiving image data of a real-world environment; and augmenting the image data by rendering visual aspects of the one or more items over portions of the image data.

Various embodiments of the method further comprise: calibrating the one or more audio devices such that the executed audio files cause the one or more audio output devices to output a sound at a volume corresponding to a sound rating of the one or more items. Moreover, the method may further comprise determining combined audio characteristics of a plurality of items included within the simulation, and wherein compiling the one or more selected audio files comprises selecting the one or more audio files to be representative of the combined audio characteristics of the plurality of items included within the simulation. Moreover, the one or more audio files may contain a sound selected from: a ping, a tapper output, a high-heels walking example, or a sample conversation.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

Overview

A virtual or augmented reality system according to various embodiments is configured to provide users with an experience-based understanding of sound and/or visual characteristics of various items, as those characteristics would be experienced in use. Those items may include various building materials, including flooring materials, ceiling materials, wall coverings, wall insulation materials, sound deadening devices, and/or the like. For example, the virtual or augmented reality system may provide users with a visualization of a particular environment (e.g., a room) including a flooring product of interest to the user. The virtual or augmented reality system may supplement the visualization with one or more audio sound samples demonstrating how the flooring product impacts sound transmission (e.g., sounds transmitted through the flooring product from a floor above). The system may also enable users to compare sound transmission characteristics against other reference points. For example, the system may output other sound samples of perceived "louder" or "quieter" products (e.g., identified based on sound transmission ratings) to provide users with a real-world understanding of differences between products.

Visual components of the virtual reality experience may be provided to users via a visible display (e.g., a monitor, a stand-alone screen, a screen within a virtual reality headset, and/or the like), thereby allowing users to see aesthetic properties of one or more items. The visual portion of the virtual reality experience may be generated based at least in part on real-world environments (e.g., providing an augmented reality experience in which the visual components of a real-world environment is virtually modified) or entirely virtual environments existing only within the virtual reality system.

The sound characteristics of the various items are virtually demonstrated to the user of the virtual reality system via audio output of the virtual reality system (e.g., headphones, speakers, ear buds, and/or the like). In certain embodiments, the audio output may be provided without a visual component of the virtual reality system (e.g., to demonstrate how a particular product impacts sound transmission, even without visually displaying which product is being demonstrated). The virtual reality system may be configured to self-calibrate the volume of the audio output to provide accurate volume-based representations of the sound characteristics of the items represented via the virtual reality system.

The virtual reality system may be configured to provide audio-based representations of the sound characteristics of various items based on tests conducted on those items to determine sound characteristic ratings. The virtual reality system may include a non-transitory memory storage area including sound samples of sound characteristic test results that may be matched with various items visually displayed via the virtual reality system based on stored sound rating data for each visually displayed item. In certain embodiments, each visually displayed item may have an associated set of unique sound samples (e.g., sound samples generated during testing of the particular visually displayed item), or each visually displayed item sample may be matched with a subset of item-agnostic sample sound sets (e.g., applicable to a plurality of items) generated for particular sound rating levels. As specific examples, unique sound samples may be provided for individual items demonstrating the impact of the particular item on sound transmission for various activities and/or sounds generated during a sound rating test (e.g., the volume of high heels stepping on a flooring product in an adjacent room, the volume of a normal conversation in an adjacent room, the volume of a test ping or tap generated in an adjacent room (e.g., positioned above the visualized room) under standardized test conditions, and/or the like). As yet another example, a single, item-agnostic sound sample may be stored for the volume of a ping or tap generated under standardized test conditions for each of a plurality of sound ratings. In the latter example, a subset of the item-agnostic sound samples are selected and matched with a particular visualized item based on the sound rating data for the item, and those item-agnostic sound samples may be applied to a plurality of items having identical sound ratings.

Sample Generation

Sound samples may be generated via any of a variety of sound sample collection and/or generation methodologies for one or more items. As mentioned above, item-agnostic sound samples may be generated for one or more standardized sound rating levels, and those generic item-agnostic samples may be utilized for a plurality of items having the same sound rating level. Thus, a single sound sample may be generated for each discrete sound rating level within a sound rating level scale. As a specific example, a single sound sample may be generated for each discrete sound rating level along the IIC (Impact Insulation Class) rating scale, and those sound samples may be each be utilized to represent sound levels for a plurality of items having the same IIC rating. As yet other examples, sound samples may be generated for various sound rating levels along the Sound Transmission Class (STS) rating scale, various values of the Noise Reduction Coefficient (NRC) rating scale, and/or the like.

In certain embodiments, unique sound samples may be generated and stored for each item that may be represented via the virtual reality system. These samples may be generated while the respective item is being tested (e.g., while the particular item is being tested to determine its IIC rating class). A plurality of sound samples may be provided for each item as mentioned above. For example, a first sound sample may be provided for a test ping or tap used during the testing procedure for determining the IIC rating class for the item, a second sound sample may be provided for the volume of high-heels walking on the item in an adjacent (e.g., immediately above) room, a third sound sample may be provided for the volume of a conversation occurring in an adjacent (e.g., immediately next to) room, and/or the like. It should be understood that these examples are not to be construed as limiting, as sound samples may be generated to represent the perceptible volume of any of a variety of sounds/activities.

Sound samples may be generated to represent a variety of sound characteristics of a particular item. In addition to and/or alternatively to sound transmission characteristics of the items, sound samples may be generated to represent sound reflective characteristics of various items (e.g., the level of echo within a room including the item).

In certain embodiments, sound samples may be generated for combinations of various items. For example, sound samples may be generated for a combination of a particular flooring material, flooring underlayment, and ceiling material (e.g., in a room immediately below the flooring).

As mentioned, the sound samples may be collected during testing of one or more items according to standardized sound testing procedures. In certain embodiments, the testing procedures utilize a sound generator (e.g., a speaker, a tapping machine, a person walking on an item, a rolling-device travelling along a surface of the item, and/or the like) and a microphone or other electronic sound collection device. The microphone may be placed in a standardized position relative to the sound generator (e.g., on an opposite side of the item relative to the sound generator for sound transmission tests, on a same side of the item relative to the sound generator for sound reflection tests, and/or the like) to record the volume, frequency, and/or other characteristics of the sound generated by the sound generator.

The sound testing may be performed in a sound testing chamber specifically configured to perform one or more sound rating tests. Items to be tested may be installed within the sound testing chamber, specific sounds (e.g., having a given volume and frequency) may be generated at specific orientations relative to the installed items, and the sounds may be recorded via a sound collection device positioned at a defined orientation relative to the installed items. In other embodiments, the sound testing may be performed in real-world installations in which the items to be tested are installed within an intended final use environment (e.g., laminate wooden flooring products within an apartment, a house, an office, and/or the like).

The sound signals collected by the sound collection device may be passed to a computing device (e.g., comprising one or more processors and one or more non-transitory memory storage areas) for conversion into a storable sound file (e.g., MP3, WAV, WMA, AAC, and/or the like). The stored sound-file may be a lossless sound file for preserving an accurate representation of the sound recorded by the sound collection device that may be reproduced by the virtual reality system. Stored sound-files of certain embodiments may be "lossy" and/or compressed sound formats that may be stored and/or transmitted by/between computing devices with minimal processing and/or storage requirements. It should be understood that the stored sound-file may have any of a variety of formats, including any of lossless, "lossy," and/or other compressed sound formats.

The sound files may be stored with additional data indicative of the item tested, test methodology (e.g., laboratory testing, real-world testing, and/or the like), sound type generated (e.g., a ping, a high-heel impact sound, a conversation, and/or the like), sound level rating (e.g., IIC-50), and/or the like. The additional data may be stored as metadata with the sound file itself, or it may be stored in a database entry associated with the sound file.

In certain embodiments, the sound files may be stored in a centralized server system accessible via a network by one or more virtual reality systems operating in locations geographically remote from the centralized server. However, in certain embodiments the sound files may be stored locally, via onboard non-transitory memory storage devices of the virtual reality systems.

Virtual Reality System

Figure 1:
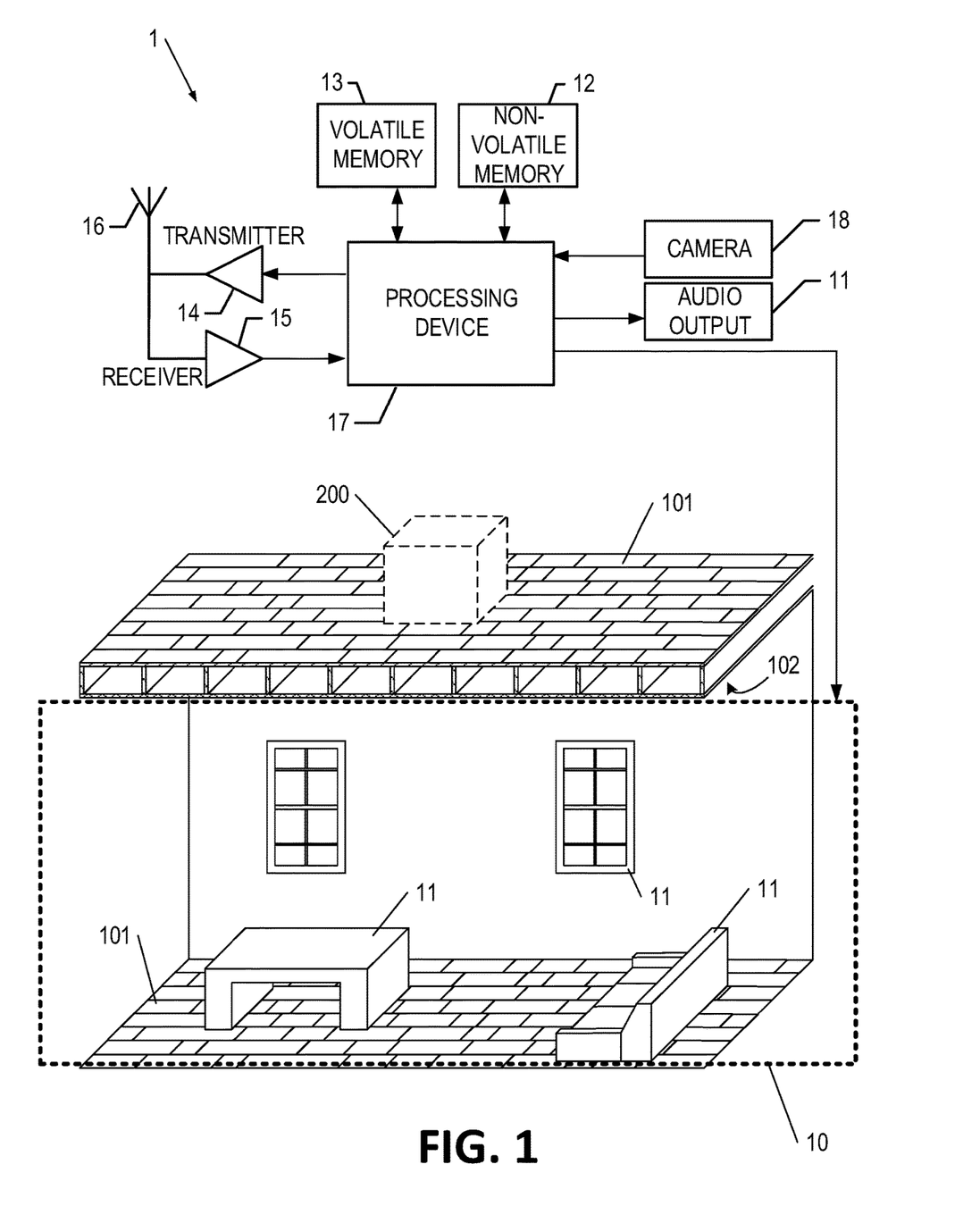
FIG. 1 shows an example simulated environment generated via a virtual reality system, including both visible and non-visible aspects of the simulation.

As mentioned, the virtual reality system 1 may be configured to provide an immersive visual and/or audio experience to users, providing a virtual representation of the aesthetic and/or sound characteristics of various items. FIG. 1 illustrates an example virtual environment that may be represented via the virtual reality system 1.

The virtual reality system 1 may be particularly suitable for demonstrating the aesthetic and sound characteristics of various building materials, such as flooring materials (e.g., hardwood flooring, carpet, engineered hardwood flooring, laminate flooring, tile, luxury vinyl tile (LVT) and/or the like) flooring underlayment (e.g., tile underlayment, hardwood underlayment, carpet padding, and/or the like), wall materials (e.g., paneling, sound-deadening materials, drywall, and/or the like), ceiling materials (drop ceiling panels, drywall, sound baffles, and/or the like), and/or the like. However, the virtual reality system 1 may be usable for demonstrating aesthetic and sound characteristics of any of a variety of items (e.g., stereo components, alarm systems, and/or the like).

As shown in FIG. 1, the virtual reality system according to one embodiment comprises a display (schematically shown as display outline 10) (e.g., a wearable headpiece comprising a display, a monitor, a TV, a mobile phone comprising a display, and/or the like) usable for displaying the visual, aesthetic aspects of various items, as well as other aspects of a visible environment in which the one or more items are placed. As discussed herein, the visible environment may comprise an image (e.g., static image, video, and/or the like) of a real-world environment and/or a virtually-generated environment stored in the memory of the virtual reality system 1.

The virtual reality system 1 as shown in FIG. 1 further comprises one or more audio output components 11, such as headphones (e.g., noise canceling headphones, noise isolating headphones, and/or the like), earbuds, speakers, and/or the like. The audio output components 11 may be configured to output sound in stereo and/or in surround sound, to provide a realistic and immersive audio experience for the virtual reality system 1. Embodiments utilizing sound isolating sound output mechanisms 11 (e.g., headphones or earbuds), provide an immersive audio experience for the user that limits the impact of external noises on the audio experience provided by the virtual reality system 1.

As discussed herein, the audio output components 11 are configured to output one or more sound samples stored within a non-transitory memory storage device associated with the virtual reality system 1. Data and/or executable files may be stored within a non-volatile memory 12 onboard the virtual reality system 1 for later retrieval and/or use. Selected data and/or executable files (e.g., data representative of visual components to be rendered within the display of a simulation and/or executable audio files to be executed during a simulation) may be temporarily stored within a volatile memory 13 during a simulation to facilitate use of the data and/or executable files to be utilized during the simulation.

Figure 2:
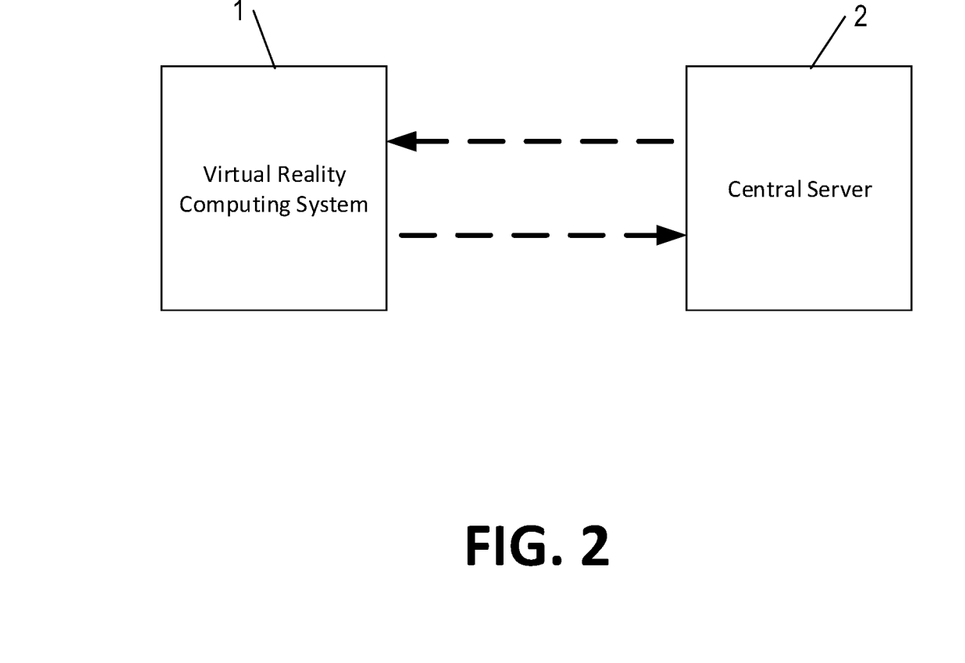
FIG. 2 is a schematic illustration of at least a portion of a network between a virtual reality system and central server.

The memory storage device (including the non-volatile memory 12 and/or volatile memory 13) associated with the virtual reality system 1 may be integrated with one or more computing entities onboard the virtual reality system 1 itself, and/or the memory storage device may be accessible by the virtual reality system 1 (e.g., via a network), and stored in association with a geographically remote central storage server 2, as shown in FIG. 2. In the latter embodiments, the virtual reality system 1 comprises a transmitter 14 and/or a receiver 15 in electronic communication with an antennae 16 configured to send and receive signals to the central storage server 2. For example, the virtual reality system 1 may be configured for wired and/or wireless communication with the central storage server 2. Via the electronic communication mechanisms, the virtual reality system 1 may be configured to retrieve one or more virtual reality system files (including visual and/or audio aspects) of a plurality of system files, and to locally store system files applicable for a desired virtual reality experience (e.g., selecting a particular environment and items to be displayed, and particular audio files applicable to the selected environment and/or items). The virtual reality system may then discard the locally stored files upon completion of a virtual reality experience.

The virtual reality system 1 may further configure one or more onboard processors 17 configured to compile relevant data files (e.g., visual and/or audio data files), to render the display and/or audio components of the virtual reality experience, and to provide perceptible outputs to the user via the display 10 and/or audio output components 11. In certain embodiments, the perceptible outputs may comprise both visual and audio components of a simulation. In other embodiments, the perceptible outputs may include audio components only or visual components only.

In certain embodiments, the virtual reality system 1 may further comprise a camera 18 for image collection. The camera 18 may be configured for real-time image collection, such that the virtual reality system 1 may be configured for providing augmented reality outputs, or the camera 18 may be configured for image collection of a particular environment that may be virtually modified later via the virtual reality processing and rendering methodologies described herein. As an example augmented reality output, the virtual reality system 1 may be configured to display the image captured by the onboard camera 18 (e.g., in real-time), and to overlay one or more surfaces displayed within the displayed image with a virtual representation of an item (e.g., a flooring material 101 and/or ceiling material 102). The augmented reality usage of the described virtual reality system 1 thereby provides a virtually augmented representation of a particular environment 11, including one or more items to be illustrated via the described virtual reality system 1.

As just one example, the virtual reality system 1 may be a fully integrated headpiece wearable by a user including a display device configured to be positioned in front of a user's eyes and speakers configured to be positioned over the user's ears. The display device may comprise an integrated display skirt surrounding a display screen and configured to prevent ambient light from interfering with the immersive virtual reality experience by extending from the display screen to the user's face and around the user's eyes. In certain embodiments, the virtual reality system 1 may comprise an integrated accelerometer or other position-detecting mechanism, such that moving the virtual reality system 1 (e.g., by moving the user's head) will cause the displayed image to change, as if the user was looking around a room.

As yet another example, the virtual reality system 1 may be embodied as a mobile phone or other handheld computing device. The handheld computing device may be attachable to a virtual reality headset, or the handheld computing device may be usable separately from various virtual reality accessories. The handheld computing device may display visual components of the virtual reality environment, and the handheld computing device may output (e.g., via separately connected headphones) audio components of the virtual reality environment.

To realistically replicate sound characteristics of the virtual reality environment (in particular, those sound characteristics of particular items presented to the user), the virtual reality system 1 may be configured to self-calibrate the volume emitted by the sound output devices 11 of the virtual reality system 1 to reflect accurate volume levels associated with various sound ratings and/or other sound characteristics replicated by the virtual reality system 1 (e.g., a sound rating of a particular flooring material 101). The sound calibration may be based on a known sound output device 11 associated with the virtual reality system 1 (e.g., specifically identified headphones having known output characteristics), such that only a single calibration is needed for the life of the virtual reality system 1, or the virtual reality system 1 may be configured for periodic sound calibration, for example, by comparing a known sound output (having a known expected volume) against a sound volume detected by a calibration microphone associated with the virtual reality system 1, and automatically adjusting the output volume to match a calibration setting.

METHOD OF USE

Figure 3:
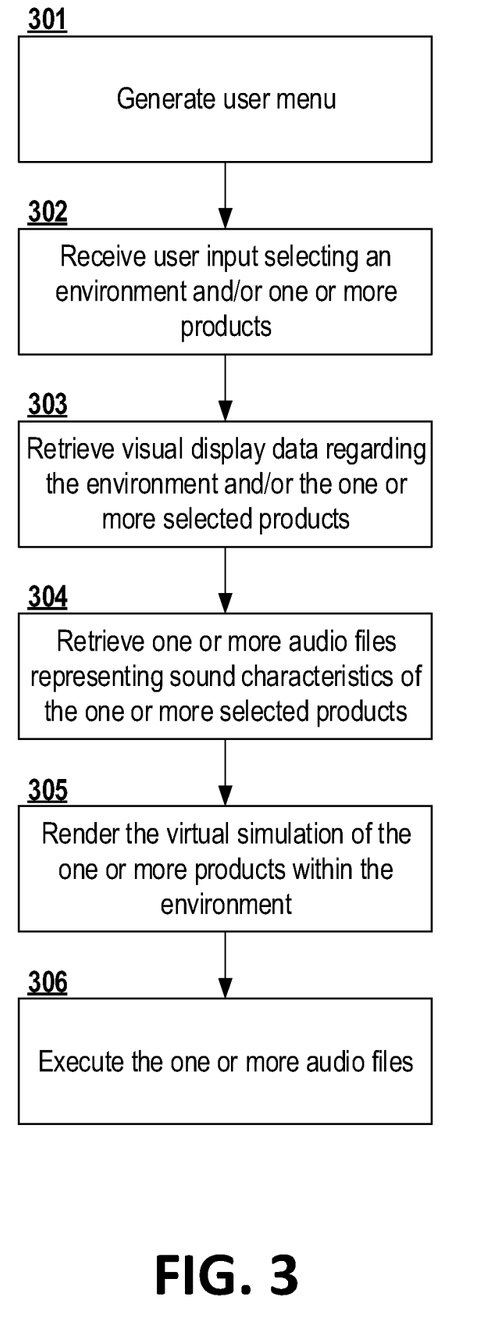
FIG. 3 is a flowchart illustrating various example steps of a method according to various embodiments.

Usage of the described virtual reality system 1 provides an immersive virtual experience for the user, including at least one of a visual representation of various items (e.g., within a surrounding environment) and/or an audible representation of various sound characteristics of the displayed items. FIG. 3 provides a flow chart of an example method of use of the virtual reality system 1. Thus, the virtual reality system 1 provides a perceptible representation of sound-based characteristics of various items, such as the audible transmission of sounds through various building items (e.g., walls, floors, ceilings, and/or the like). Users can thus have an understanding of the sound characteristics of various items, for example having known sound characteristic ratings (e.g., IIC rating), based on audible virtual representations of those characteristics.

As mentioned herein, the virtual reality system may be usable to represent a plurality of different items, and therefore the virtual reality system may have an associated selection menu enabling a user to select one or more different items, different environments, and/or the like to be represented via the virtual reality system. As shown at block 301 of FIG. 3, the user menu is generated and provided to a user of the virtual reality system 1. The selection menu may be integrated with the virtual reality system 1, for example, displayed via the display of the virtual reality system. The selection menu may also be displayed via a separate display device configured for providing rendering instructions to the virtual reality system 1. As yet another example, the selection menu may be provided via a mechanically-actuated device (e.g., comprising a plurality of buttons each configured to provide a defined rendering via the virtual reality system).

Upon receipt of user input selecting an environment (including various environmental attributes 11, such as windows, furniture, walls, and/or the like) and/or one or more items to be simulated (as shown at Block 302), the virtual reality system 1 retrieves visual and audio data relevant for the virtual reality experience selected by the user, as shown at Blocks 303-304.

The virtual reality system 1, via the integrated processor 17, is configured to render a virtual environment for display via the display device of the virtual reality system 1 based at least in part on a user-provided selection of one or more items to be included in the virtual representation (e.g., provided via the selection menu) as shown at Block 305. The rendering may include a representation of various aesthetic characteristics of the selected items (e.g., color, texture, and/or the like), aesthetic characteristics of various selected environmental attributes 11, and/or the like.

Moreover, the virtual reality system 1 is configured to output one or more sounds associated with the one or more items displayed in the virtual rendering. As mentioned herein, various items (and/or combinations of items) may have associated unique sound files executable via the virtual reality system 1. In such embodiments, the virtual reality system 1 is be configured to execute one or more of the sound files associated with the selected one or more items while the one or more items are displayed, as indicated at Block 306. For example, the one or more sound files may be executed such that the virtual reality system 1 outputs a sound representative of sound characteristics of one or more of the displayed items. The one or more sound files may be executed in response to a trigger event (e.g., a trigger signal generated by a selection menu, an elapsed period of time expiring, and/or the like).

The one or more sound files associated with the one or more items may be the sound collected by the sound collection device during testing of the one or more items, as discussed herein. For example, the one or more sound files associated with a particular item may comprise a sound file representing a ping or tap output by a sound generator 200 (illustrated in FIG. 1 to represent an example source location for a generated sound that may be experienced by users of the virtual reality system 1) recorded by the sound capture device during testing, a sound collected during a high-heel strike of the item, and/or the like. A plurality of sound files may be provided, with each sound file representing a different sound collected by the sound collection device during testing of the item.

To select a particular sound file to be executed during a virtual representation of the item, the virtual reality system 1 is configured to retrieve the associated sound files from the non-transitory memory. The sound files may be identified and retrieved based at least in part on identifying data associated with the sound files (e.g., stored as metadata and/or within database records associated with the sound files). For example, the sound files may have associated data identifying the items for which they are associated. Upon determining that the associated item is rendered via the display of the virtual reality system 1, the virtual reality system 1 retrieves the relevant sound files for execution during the virtual reality sequence. As discussed herein, the sound files may be representative of a perceptible sound that travels through one or more items (e.g., from an adjacent room), and therefore the virtual reality system 1 is configured to control the virtual items included in the adjacent room (even though not visible in the visual portion of the virtual reality simulation). The virtual reality system 1 may be configured to simulate identical items within a visually-simulated room and adjacent rooms to provide users with an understanding of how a particular item looks as well as how it performs for sound transmission to adjacent rooms. However, it should be understood that various embodiments enable a user to select different items for inclusion in the visually-simulated room and any adjacent rooms. Because various items may impact ambient sound transmission within a room differently from sound transmission between rooms, the virtual reality system 1 may be configured to provide an experience for the user exemplifying how different combinations of items in adjacent rooms would be perceived to a user.

Execution of a particular sound file may cause the virtual reality system 1 to generate a sound output via the sound devices 11 (e.g., headphones). Because the sound devices 11 are calibrated for volume, frequency, and/or other sound characteristics, the sound provided to the user via the sound devices is an accurate representation of sound characteristics associated with one or more items included in the virtual reality demonstration. For example, the sound may provide the user with an understanding of the volume of noise that passes through one or more items from an adjacent (e.g., overhead, next-to, and/or the like) room. As mentioned, various sound files may be associated with different generated noises. Thus, a first sound file may replicate the volume and sound of a testing "ping" generated in an adjacent room (e.g., as indicated by the sound generator 200 illustrated in FIG. 1) according to known sound level rating test procedures (e.g., IIC test procedures); and a second sound file may replicate the volume and sound heard in a first room from a person in high-heels walking across an item (e.g., a flooring material) in a second room immediately above the first room. Other sound files may be representative of ambient noises generated within a particular room, to provide an audible understanding of how a particular item impacts sound travel within a given space. For example, a sound file may replicate the volume and sound of a testing ping or tap generated a defined distance away from the user within an empty room including the item (e.g., a flooring material 101, a ceiling material 102, a wall-covering material, and/or the like). Thus, the sound file may provide the user with an understanding of how the item impacts sound echoes, sound volume, and/or the like.

As mentioned, sound files may be item specific, or the sound files may be item-agnostic and may have associated data indicative of particular sound characteristics represented by the sound files, and those sound characteristics may be matched against one or more items to provide an audible representation of the particular item's sound characteristics. As an example, an item-agnostic sound file may be representative of the volume of a ping or "tap" (e.g., a sound generated by a sound generating device, such as a tapper machine) having a defined volume transmitted through an item having a given IIC rating (e.g., a rating of IIC-50). The example sound file may be electronically matched with items having the given IIC rating (e.g., flooring materials 102 having an IIC-50 rating), such that one or more items having the given IIC rating utilize the same item-agnostic sound file to provide a representation of sound characteristics of the item.

In embodiments utilizing a single, item-agnostic sound file for one or more items having shared sound characteristics, each sound file may be associated with data defining one or more characteristics that may be matched with sound characteristic data for items. For example, the data associated with each sound file may define a sound characteristic rating (e.g., an IIC rating), a sound type (e.g., a ping, high-heels walking, suitcase rolling, conversation, and/or the like), and/or the like. Similarly, each item selectable for rendering and/or inclusion in a virtual reality simulation may comprise data defining various sound characteristics of the item (e.g., an IIC rating), as well as other item characteristics (e.g., visual characteristics for rendering within the visual portion of the virtual reality simulation).

As a specific example, various embodiments may be utilized to virtually demonstrate visual and/or audible characteristics of a flooring product. Thus, a flooring manufacturer may utilize an embodiment as an advertisement tool to provide potential customers (e.g., architects, building owners, multi-unit property managers, and/or the like) with a virtual representation of how a flooring product will be perceived in a potential installation. Users (e.g., potential customers) may be presented with a visual representation of an advertised flooring product installed in a room, and may be presented with an audible representation regarding how sound is transmitted through the advertised flooring product and/or within a room including the flooring product. Users may additionally be presented with other reference sounds to provide an indication regarding how other flooring products perform relative to the advertised product. Thus, users may experience a simulated environment to provide an understanding regarding how differently rated flooring products (e.g., flooring products having different IIC ratings) perform when installed. This may provide users with an indication regarding how similar—or how different—sound is transmitted through products having adjacent rating levels (e.g., to compare similarities in sound transmission between products having an IIC-50 rating versus products having an IIC-49 rating).

To select a particular sound file for execution within a virtual reality simulation, the virtual reality system 1 identifies the one or more items included within a given simulation. The virtual reality system 1 then queries data associated with the one or more items (e.g., data included within a database entry associated with the item) to identify one or more sound characteristics of the simulated item. The virtual reality system 1 may then query a separate sound file database to identify one or more item-agnostic sound files reflecting sound characteristics matching those of the item. The virtual reality system retrieves the one or more identified matching sound files for execution. In embodiments in which a plurality of sound files are identified as matching the sound characteristics of the simulated items, the virtual reality system 1 may present the user with a menu of options for sounds to be simulated, thereby enabling a user to select a particular sound file to be executed within the simulation.

In certain embodiments, the virtual reality system 1 is configured to execute a plurality of sound files simultaneously. The virtual reality system 1 may thereby demonstrate how various sounds are perceptible to a user during simulated, real-world experiences. For example, the virtual reality system 1 may be configured to simultaneously execute a first sound file comprising a sound representative of a conversation occurring within a particular room (e.g., the simulated room in which the user is virtually occupying) and a second sound file comprising a sound representative of high-heels walking on a floor above the simulated room.

CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

As mentioned, the virtual reality system 1 may be configured for providing augmented reality simulations, by augmenting a captured image of a particular environment (e.g., a room) with one or more items shown as overlaid over portions of the image. Such embodiments may be further configured for providing audible representations of sound characteristics of the items included within the augmented reality simulation in accordance with the methodologies discussed herein.

That which is claimed:
1. A virtual reality system for simulating sound characteristics of items included within a simulation, the virtual reality system comprising:
an onboard computing system having one or more non-transitory memory storage areas and one or more processors, the onboard computing system configured to:
store, within the one or more non-transitory memory storage areas, item data indicative of aesthetic and sound characteristics of one or more items, wherein the sound characteristics are indicative of a sound level corresponding to an associated item;
store, within the one or more non-transitory memory storage areas, a plurality of item-agnostic calibrated audio files, wherein each of the item-agnostic calibrated audio files are reflective of a calibrated sound level as indicated by sound characteristic data;
compile data regarding aesthetic and sound characteristics of one or more items to be included within a simulation;
virtually build a simulated environment including the one or more items to be included within the simulation by:
rendering, via a display device in electronic communication with the onboard computing system, visual aspects of the one or more items within the simulated environment based at least in part on the item data stored in the one or more non-transitory memory storage areas;

matching the sound characteristics associated with the one or more items with sound characteristic data associated with one or more item-agnostic calibrated audio files selected from the plurality of item-agnostic calibrated audio files based at least in part on the item data stored in the one or more non-transitory memory storage areas;

retrieving the one or more selected item-agnostic calibrated audio files from the plurality of item-agnostic calibrated audio files; and output, via the display device and one or more audio output devices, the simulated environment, wherein each of the one or more selected item-agnostic calibrated audio files is executed to output a respective calibrated sound level representative of the sound level associated with the one or more items included in the simulated environment.

2. The virtual reality system of claim 1, wherein each of the plurality of item-agnostic calibrated audio files comprise data indicative of an item sound rating represented by audio of the item-agnostic calibrated audio files.

3. The virtual reality system of claim 2, wherein each of the plurality of item-agnostic calibrated audio files comprises audio recorded during a sound rating test.

4. The virtual reality system of claim 1, wherein the one or more items included within the simulation are selected from a plurality of items represented in data stored within the one or more memory storage areas.

5. The virtual reality system of claim 4, wherein the one or more items included within the simulation are selected based on user input provided to a user menu generated by the onboard computing system.

6. The virtual reality system of claim 1, wherein the onboard computing system is configured to electronically communicate with a central server comprising one or more central non-transitory memory storage areas storing data indicative of a plurality of items available for display via the virtual reality system.

7. The virtual reality system of claim 1, wherein virtually building a simulated environment further comprises:
receiving image data of a real-world environment; and
augmenting the image data by rendering visual aspects of the one or more items over portions of the image data.

8. The virtual reality system of claim 1, wherein the one or more audio output devices are calibrated such that the executed audio files cause the one or more audio output devices to output a sound at a volume corresponding to a sound rating of the one or more items.

9. The virtual reality system of claim 1, wherein the onboard computing system is configured to determine combined audio characteristics of a plurality of items included within the simulation, and wherein the one or more selected item-agnostic calibrated audio files are determined to be representative of the combined audio characteristics of the plurality of items included within the simulation.

10. The virtual reality system of claim 1, wherein the one or more item-agnostic calibrated audio files contain a sound selected from: a ping, a tapper output, a high-heels walking example, or a sample conversation.

11. A method for virtually simulating characteristics of an environment, the method comprising:
storing, within one or more non-transitory memory storage areas, item data indicative of aesthetic and sound characteristics of one or more items, wherein the sound characteristics are indicative of a sound level corresponding to an associated item;

storing, within the one or more non-transitory memory storage areas, a plurality of item-agnostic calibrated audio files, wherein each of the item-agnostic calibrated audio files are reflective of a calibrated sound level as indicated by sound characteristic data;

compiling data regarding aesthetic and sound characteristics of one or more items to be included within a simulation;

virtually building a simulated environment including the one or more items to be included within the simulation by:
rendering, via a display device, visual aspects of the one or more items within the simulated environment based at least in part on the item data stored in the one or more non-transitory memory storage areas;
matching the sound characteristics associated with the one or more items with sound characteristic data associated with one or more item-agnostic calibrated audio files selected from the plurality of item-agnostic calibrated audio files based at least in part on the item data stored in the one or more non-transitory memory storage areas;
retrieving the one or more selected item-agnostic calibrated audio files from the plurality of item-agnostic calibrated audio files; and
outputting, via the display device and one or more audio output devices, the simulated environment, wherein each of the one or more selected item agnostic calibrated audio files is executed to output a respective calibrated sound level representative of the sound level associated with the one or more items included in the simulated environment.

12. The method for virtually simulating characteristics of an environment of claim 11, wherein each of the plurality of item-agnostic calibrated audio files comprise data indicative of an item sound rating represented by audio of the item-agnostic calibrated audio files, and wherein compiling one or more selected audio files comprises identifying item-agnostic calibrated audio files representing an item sound rating matching data identifying an item sound rating for the one or more items included in the simulation.

13. The method for virtually simulating characteristics of an environment of claim 11, further comprising: selecting the one or more items included within the simulation from a plurality of items represented in data stored within the one or more memory storage areas.

14. The method for virtually simulating characteristics of an environment of claim 13, further comprising:
generating a visual user menu identifying a plurality of available items to be included within the simulation; and
receiving user input identifying the one or more selected items via the user menu.

15. The method for virtually simulating characteristics of an environment of claim 11, further comprising: retrieving, from a central server comprising one or more central non-transitory memory storage areas, item data indicative of the one or more items included within the simulation.

16. The method for virtually simulating characteristics of an environment of claim 11, further comprising:
receiving image data of a real-world environment; and
augmenting the image data by rendering visual aspects of the one or more items over portions of the image data.

17. The method for virtually simulating characteristics of an environment of claim 11, further comprising: calibrating the one or more audio output devices such that the executed audio files cause the one or more audio output devices to output a sound at a volume corresponding to a sound rating of the one or more items.

18. The method for virtually simulating characteristics of an environment of claim 11, further comprising: determining combined audio characteristics of a plurality of items included within the simulation, and wherein compiling the one or more selected audio files comprises selecting the one or more item-agnostic calibrated audio files to be representative of the combined audio characteristics of the plurality of items included within the simulation.

19. The method for virtually simulating characteristics of an environment of claim 11, wherein the one or more item-agnostic calibrated audio files contain a sound selected from: a ping, a tapper output, a high-heels walking example, or a sample conversation.

* * * * *